J. F. HARDY.
DENTAL BROACH BLANK MAKING MACHINE.
APPLICATION FILED FEB. 23, 1910.
1,082,589.
Patented Dec. 30, 1913.
5 SHEETS—SHEET 2.
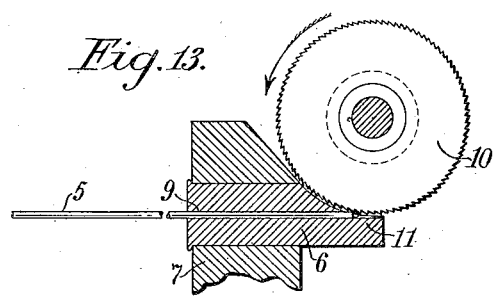
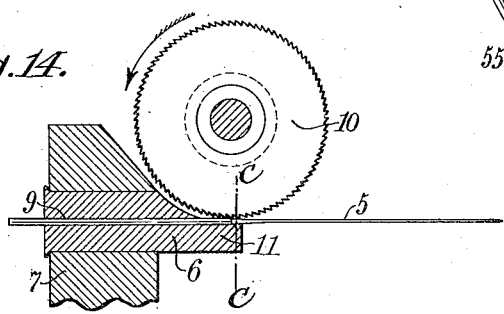
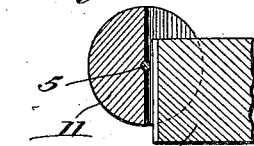
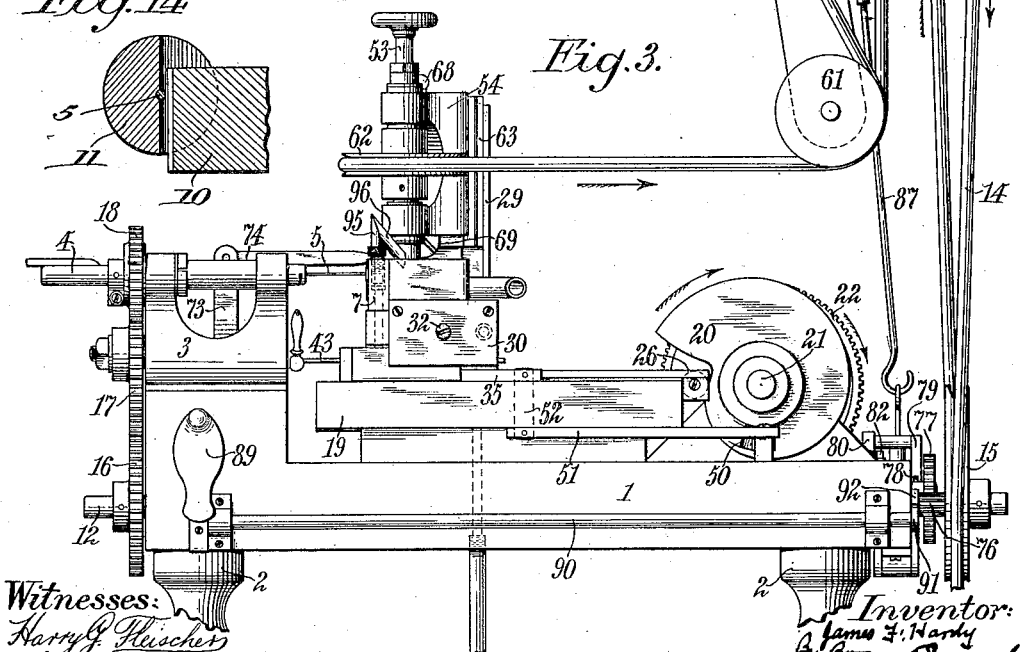
Witnesses:
Harry J. Fleischer
F. George Barry
Inventor:
James F. Hardy
By Brown & Seward
his Attorneys J. F. HARDY.
DENTAL BROACH BLANK MAKING MACHINE.
APPLICATION FILED FEB. 23, 1910.
1,082,589.
Patented Dec. 30, 1913.
5 SHEETS—SHEET 4.
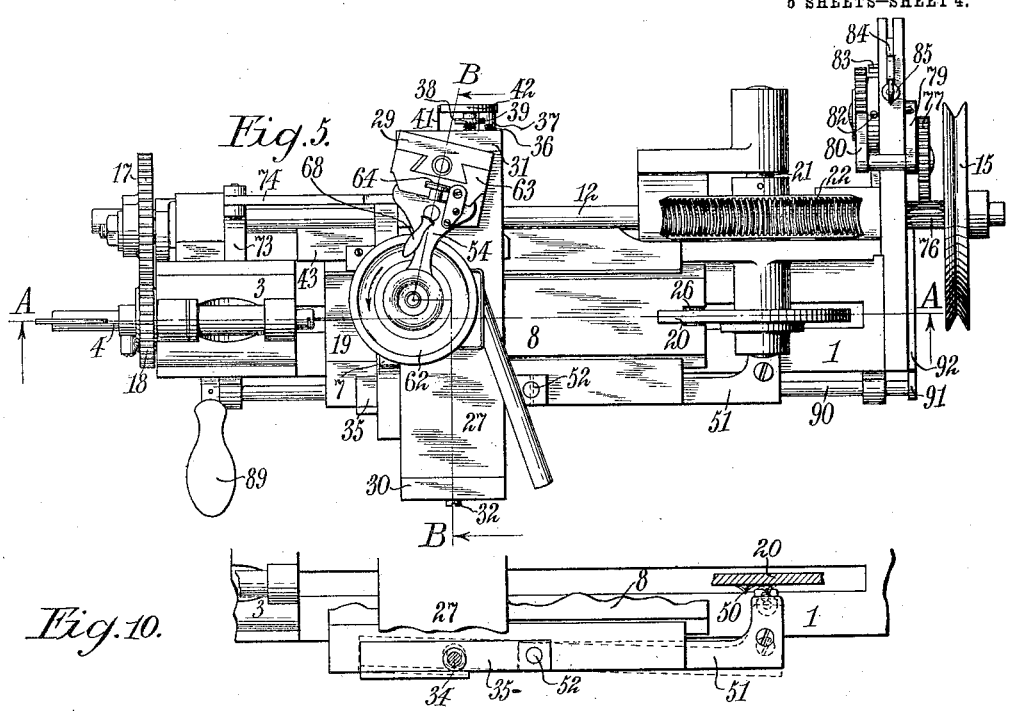
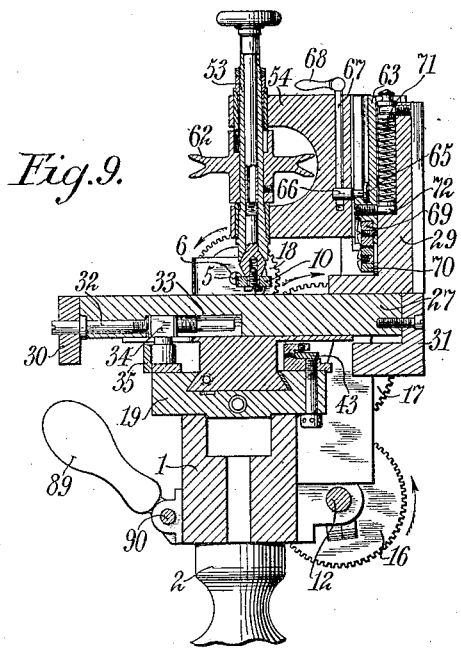
Witnesses:
Harry G. Fleischer
F. George Barry
Inventor:
James F. Hardy
By Brown & Ewart
his Attorneys

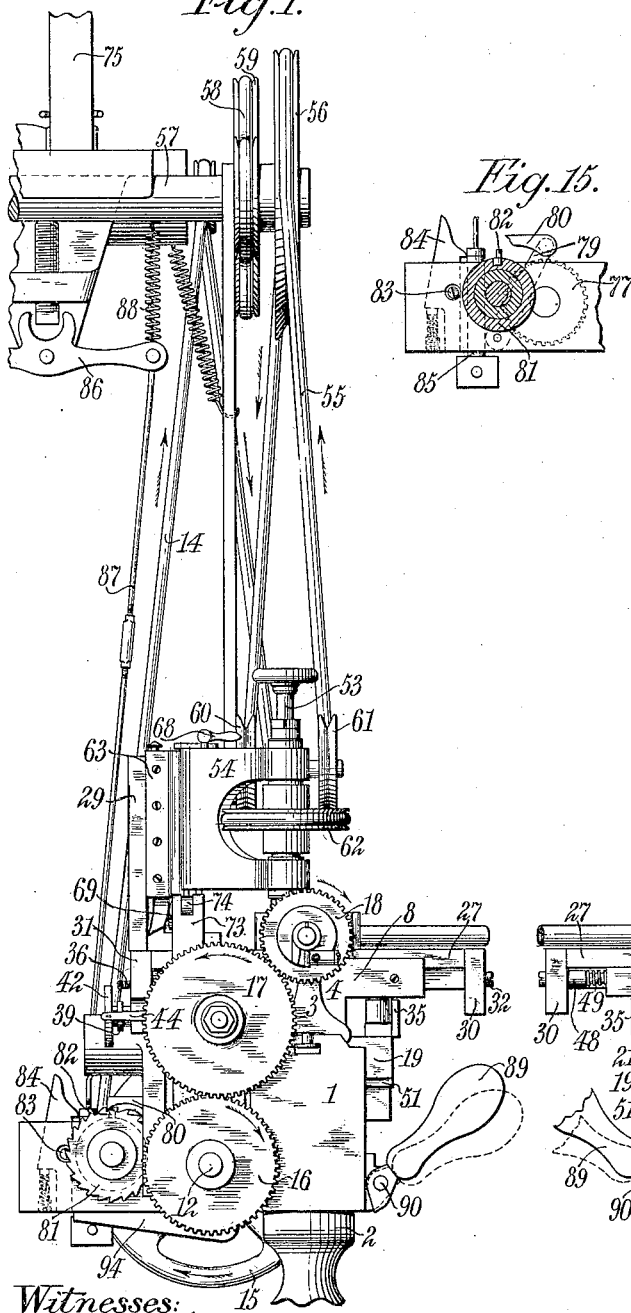

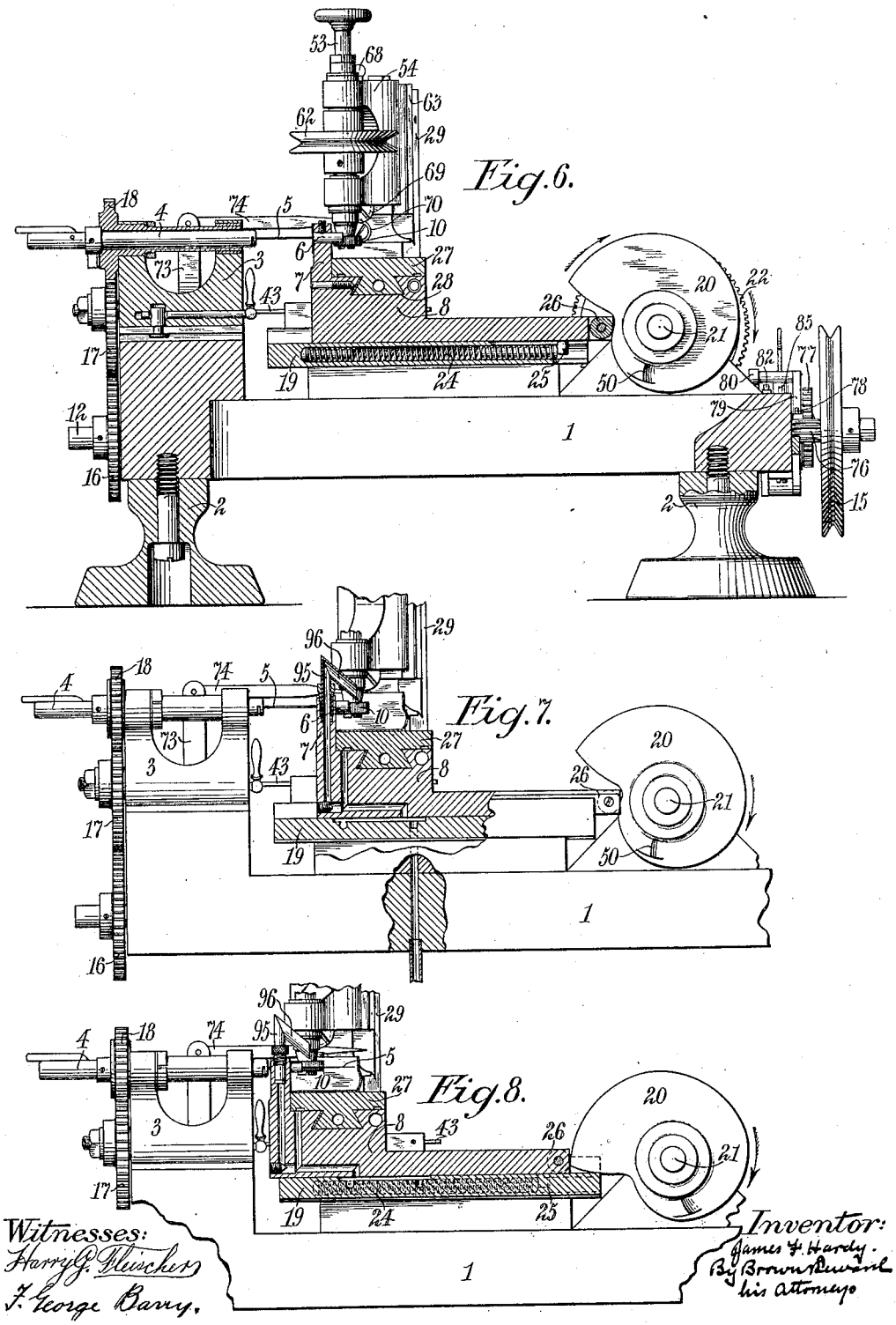

UNITED STATES PATENT OFFICE.

JAMES F. HARDY, OF NEW YORK, N. Y., ASSIGNOR TO CONSOLIDATED DENTAL MANUFACTURING COMPANY, OF NEW YORK, N. Y., A CORPORATION OF NEW YORK.

DENTAL BROACH-BLANK-MAKING MACHINE.

1,082,589.      Specification of Letters Patent.      Patented Dec. 30, 1913.

Application filed February 23, 1910. Serial No. 545,304.

*To all whom it may concern:*

Be it known that I, JAMES F. HARDY, a citizen of the United States, and resident of the borough of Manhattan, in the city and State of New York, have invented a new and useful Dental Broach-Blank-Making Machine, of which the following is a specification.

My invention relates to a machine for making dental broach blanks, with the object in view of accurately tapering and pointing hard steel wire ready for burring.

Figure 4:
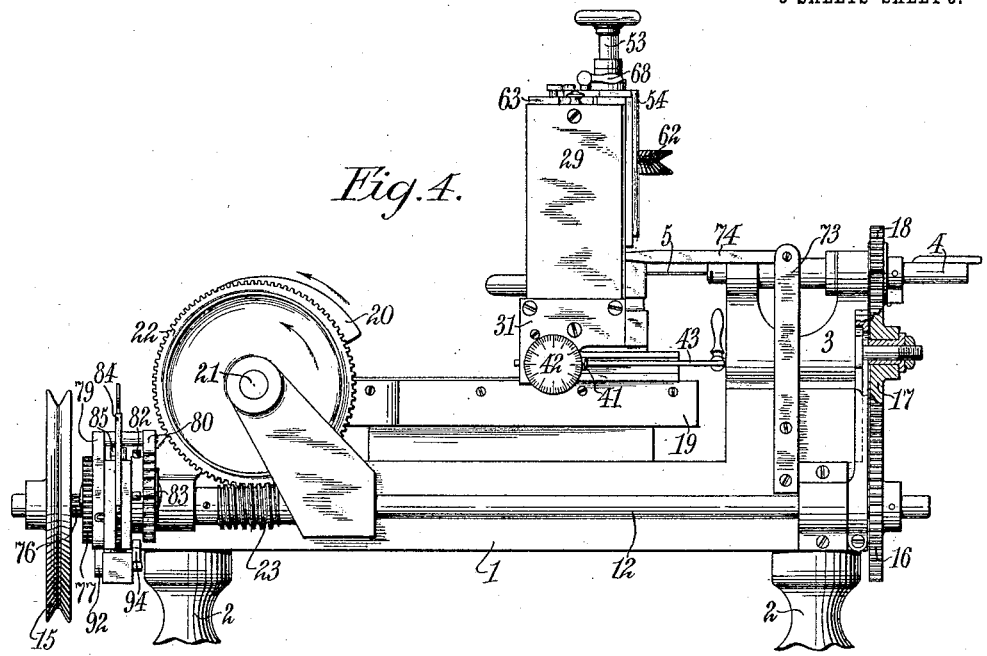
Figure 11:
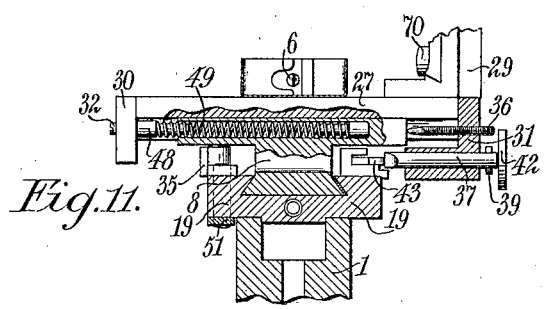
Figure 12:
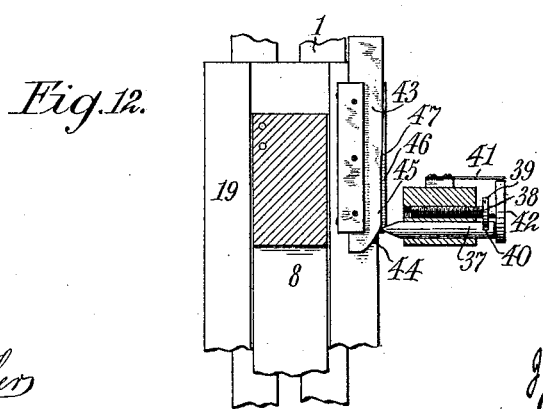

A practical embodiment of my invention is represented in the accompanying drawings in which, Figure 1 is a view in front end elevation, Fig. 2 is a view in rear end elevation, Fig. 3 is a view in side elevation, Fig. 4 is a reverse side elevation, the driving connections being omitted, Fig. 5 is a top plan view, the driving connections being omitted, Fig. 6 is a vertical longitudinal section in the plane of the line A—A, Fig. 5, Fig. 7 is a view partly in side elevation and partly in section, showing the arrangement of the oil ducts and showing the primary cutter carriage at the beginning of its longitudinal movement, Fig. 8 is a similar view showing the primary cutter carriage at the limit of its advance movement, Fig. 9 is a vertical transverse section in the plane of the line B—B, Fig. 5, Fig. 10 is a detail plan view partly in section, showing the mechanism for imparting to the secondary cutter carriage a slight lateral movement at the end of its advance and during its normal return stroke, Fig. 11 is a view in detail partly in section, showing the secondary cutter carriage and the parts which coact immediately therewith, Fig. 12 is a horizontal section through the same, Fig. 13 is an enlarged view in detail showing the relation of the cutter to the wire at the beginning of the operation, Fig. 14 is a similar view showing the relation of the cutter to the wire at the end of the operation, and Fig. 14* is an enlarged transverse section in the plane of the line C—C, Fig. 14, Fig. 15 is a detail showing parts of the belt shifting mechanism.

The cutter which operates on the wire is supported on a carriage which travels a limited distance transverse of the machine and this in turn upon a carriage which travels longitudinally of the machine a distance corresponding to the length of the reduced portion of the blank. For convenience, I term this latter carriage the primary cutter carriage, and the former the secondary cutter carriage.

The bed of the machine, denoted by 1, may be of oblong rectangular form and preferably with open center and may be supported on legs 2, or in any other desired manner. At one end of the bed there is an uprising bracket 3, in which a rotary wire holder 4 is mounted. The particular construction of the wire holder 4 forms no part of my present invention. It consists, briefly, of a hollow sleeve through which the wire 5 is passed and in which the wire is clamped by any well known or approved means. It is intended that the wire shall project beyond the inner end of the holder 4 a distance somewhat greater than the length of the part to be operated upon by the cutter in order that it may pass through a firm rest 6, see Figs. 6, 13, 14, before it reaches the cutter. The rest 6 may practically consist of a hard steel plug set in the upwardly extending portion 7 of the primary cutter carriage 8, the said plug having a hole 9 extending longitudinally through it, of just sufficient size to permit the wire 5 to slide and rotate and the inner end of the plug being partially cut away on the side toward the cutter 10 down to and partially or entirely through the hole 9, leaving a projecting jaw 11 to form a rest for the wire directly opposite that portion of the cutter which is acting upon the wire. This feature of firmly supporting the rotary wire at the point opposite the point of contact of the cutter is of vital importance in operating upon a fine, very hard steel wire, such as is suitable for a dental broach, and makes possible pointing as well as the tapering of the wire, as will hereinafter appear. An operating shaft 12 is supported in suitable bearings at one side of the bed 1, and receives motion from a drive shaft 13 by a belt 14 passing around a pulley 15 on one end of the shaft 12. At the opposite end of the shaft 12, a spur wheel 16 carried by the shaft, intermeshes with an intermediate spur wheel 17, and this in turn with a spur wheel 18 on the rotary wire holder 4, to impart to the wire 5, a rotary motion while it is being acted upon by the cutter 10.

The primary cutter carriage 8 is supported in sliding adjustment in a way 19 on the bed 1, and with the secondary cutter carriage and cutter is advanced by a small cam 20, fixed on a shaft 21, which shaft has also fixed thereon a worm wheel 22, driven by a worm 23 on the operating shaft 12. The primary carriage is retracted by a spring 24 housed in a socket in the way 19 and engaged by a pin 25 projecting downwardly from the carriage. The carriage 8 is provided with an anti-friction roller 26 to bear against the face of the cam 20.

The secondary or transversely moving cutter carriage is denoted by 27. It is mounted in a way 28 in the primary carriage 8, and carries the cutter supporting pillar 29, (see Fig. 9). It has depending end pieces 30, 31, fixed thereto and through the piece 30, a swiveled screw 32 extends into a recess 33 in the carriage, an adjustable stop 34 being engaged with the screw 32 in position to engage an arm 35 for a purpose which will hereinafter appear. Through the piece 31 an adjusting screw 36 extends (see Fig. 11) to limit the movement of the carriage under the tension of its retracting spring. The piece 31 also supports the guide pin 37 (see Fig. 12), and its operating micrometer screw 38, the connection between the shank of the screw and the pin consisting of a flange 39 on the shank entering a slot 40 in the side of the pin. A spring 41, with its free end resting on the milled rim of the micrometer disk 42, serves to hold the micrometer screw and hence the guide pin, against accidental displacement. The guide pin 37 coacts with a cam 43 fixed on the way 19 to move the secondary cutter carriage and hence the cutter, laterally during the travel of the cutter along the wire to give the wire the desired pointed and tapered shape to complete the broach blank. The cam 43 has operating surfaces of varying pitches, in the present instance, a steep pitch 44, to form the point, then a straight portion 45 to form that portion of the blank which is to receive the burs, and then a very slightly tapered portion 46 to a point where the cutter is about to complete its work and finally a more decided pitch 47 at the finish. The end piece 30 of the secondary carriage 27 engages, by means of a pin 48, a retracting spring 49 seated in a transverse socket in the primary carriage, which spring tends to draw the carriage in a direction to hold the engaging edge of the guide pin 37 against the cam 43. In order, however, to relieve the pressure of the guide pin 37 against the cam 43 during the return movement of the primary carriage 8, and to free the cutter from the wire at the finish of its cut and during its return movement, the secondary carriage 27 is given a temporary lateral movement against the tension of its retracting spring as follows: A V-cam 50 (see Fig. 10) on the side of the snail cam 20, engages at the proper moment the end of a rocking arm 51 fixed to the pivot pin 52, the said pin having also fixed thereto the arm 35 engaged with the adjustable stop 34 on the swiveled screw 32. As the cam 50 rocks the arm 51 outwardly, the arm 35 will be forced inwardly and by its engagement with the stop 34, will force the carriage 27 laterally against the tension of its retracting spring a slight distance, shown in dotted lines Fig. 10, the distance depending upon the adjustment of the stop 34, but in any event, sufficient to relieve the guide pin 37 from the cam 43 and the cutter from the wire, and this action is so timed by the location of the V-cam on the snail cam that it will take place just as the cutter finishes its work and the primary carriage springs back under the tension of its retracting spring. The cutter 10 is fixed to revolve with its spindle 53 of any well known or approved construction and forming specifically no part of my present invention. The spindle 53 is mounted in suitable bearings in a vertically reciprocating head block 54, and motion is imparted to the cutter through a band 55 leading from a pulley 56 on a shaft 57 driven by a band 58 from a pulley 59 on the drive shaft 13. The band 55 passes under guide pulleys 60, 61, which direct it to the pulley 62 on the cutter spindle 53. The head block 54, with the cutter, is given a reciprocating movement in order to bring the full width or a considerable width of the cutter face into engagement with the wire during a cutting operation as distinguished from holding the cutter in the same plane relative to the wire and hence causing the wire to be operated upon by the same portion of the cutting face. This vertical movement is provided for as follows: The head block 54 is clamped to an intermediate block 63 which has a dovetail sliding connection with the pillar 29 on the carriage 27. The intermediate block 63 is provided with an undercut slot 64 which receives the shank and head of a clamp pin 65. An enlarged portion of the shank of the pin 65 extends into a socket 66 in the back of the head block 54 and is provided with a circular hole to receive an eccentric on a rod 67 which may be turned by a handle 68 to draw the head block 54 and intermediate block 63 into close frictional contact so that they will move together. This also provides for setting the head block 54 and hence the cutter in the desired position relative to the wire 5. The intermediate block 63 has a roller 69 journaled in or on its lower end and the pillar 29 has a roller 70 journaled on it with its face normally in close proximity to the face of the roller 69. A spring 71 set in a socket in the pillar 29, is engaged by a stud 72 set in the block 63 and tends to force the block 63 and the parts carried thereby downward, or the roller 69 toward the roller 70. An uprising arm 73 (see Fig. 4) is fixed to the side of the bed 1 and carries at its upper end a dagger 74, the point of which extends between the rollers 69 and 70 and as the primary carriage advances gradually spreads the rollers 69 and 70 apart, lifting the block 63 and hence the cutter, causing its face to traverse the wire.

The bracket 3 referred to early in the description as a support for the wire holder 4, may be adjustably secured to the end of the bed 1, by a headed pin and rod provided with an eccentric (see Fig. 6) in a manner quite similar to that described for locking the head block 54 to the intermediate block 63.

Provision is made for automatically throwing the drive belt 75 and thereby stopping the machine at the end of each operation, as follows: A pinion 76 (see Fig. 3) on the operating shaft 12, engages a spur wheel 77 carrying a pin 78 in position to engage and rock a spring actuated arm 79 having pivoted thereon a pawl 80 which acts upon a ratchet wheel 81 which in turn carries a pin 82 in position to engage a pin 83 on a spring actuated trip dog 84. The trip dog 84 is constructed to hook over the end of a plunger 85, connected with a belt shifting arm 86 by a rod 87, the arm 86 being under spring tension by a spring 88 tending to throw the arm in a direction to shift the belt onto the loose pulley and hence stop the machine. When it is desired to start the machine, the operator depresses the handle 89 which rocks the shaft 90, carrying the short arm 91, which lifts the arm 92 fixed to the shaft 93, thereby depressing the arm 94, the free end of which is loosely engaged with the lower end of the plunger 85 and hence drawing down the plunger against the tension of the spring 88 until the trip dog 84 springs over the upper end of the plunger and holds the parts in position for the machine to operate until the dog 84 is again tripped by the action of the pin on the ratchet wheel 81.

Oil is supplied to the cutter and to the several operating parts by a system of ducts extending through the primary carriage and up through the extension 7 which supports the wire rest where a pipe extension 95, with a return branch 96, directs the oil to the cutter.

The operation of the machine as a whole may be briefly described as follows: The wire having been placed in the holder and clamped therein with its end to be operated on extended through the rest 9, as shown in Fig. 13, the handle 89 is depressed and the machine put in operation. The wire will be rotated by the gear 16, 17, 18. The cutter will be operated at high speed by the band 55, the cutter will be advanced along the wire by the snail cam 20 acting upon the primary carriage and the cutter will be withdrawn from the center line of the wire rapidly at first, then not at all for a time, then gradually and finally with a more decided movement as the work approaches completion, by the action of the guide pin 37 and the cam 43, and finally at the completion of the work, the V-cam on the side of the snail cam will give the secondary carriage a slight transverse movement to clear the guide pin and cutter from the wire and the return movement of the primary carriage and parts carried thereby will promptly take place and at the same time the drive belt will be thrown onto the loose pulley and the machine stopped for the removal of the finished blank and the insertion of a new wire.

The dagger 74 for giving the cutter a vertical movement during its cutting operation, may be thrown out of action at pleasure by swinging it over on its connection with the arm 73, and the cutter may be set to operate on the wire continuously along any annular portion of its face, if so desired.

It is evident that changes within the scope of the appended claims might be resorted to in the form and arrangement of the parts without departing from the spirit and scope of my invention; hence I do not wish to limit myself strictly to the structure herein shown and described, but

What I claim is:

1. In a machine for making dental broach blanks, a wire rest constructed with walls arranged to surround the wire and hold it against flexure, the walls of the rest being cut away at one portion to one-half their depth to leave one-half of the blank exposed along said cut away portion, means for rotating the wire while held in the rest, a cutter arranged to act upon the exposed portion of the wire in the cut away portion of the rest and means for actuating the cutter and for exposing portions of the wire successively to the cutter.

2. In a machine for making dental broach blanks, a wire rest constructed to hold the wire against flexure, the walls of the rest being cut away at one portion to a depth sufficient to leave one-half of the blank projecting beyond the plane of the walls, means for rotating the wire while so held in the rest, a cutter arranged to act upon the exposed side of the wire in the cut away portion of the rest, means for actuating the cutter and means for moving the rest and the cutter simultaneously along the wire.

3. In a machine for making dental broach blanks, a wire rest constructed to hold the wire against flexure while exposing one side of it to a cutter, means for rotating the wire while so held in the rest, a cutter arranged to act upon the exposed side of the wire opposite the rest, means for actuating the cutter, means for moving the rest and cutter simultaneously along the wire and means for moving the cutter at variable rates of speed transversely of the wire during its movement along the wire.

4. In a machine for making dental broach blanks, a wire rest constructed to hold the wire against flexure while exposing one side of it to a cutter, means for rotating the wire while so held in the rest, a cutter arranged to act upon the exposed side of the wire opposite the rest, means for actuating the cutter, means for moving the rest and cutter simultaneously along the wire and means for moving the cutter simultaneously in two different directions in a plane transverse to the wire.

5. In a machine for making dental broach blanks, the combination with means for holding the wire and a cutter for operating on the wire, of means for simultaneously moving the cutter across the wire and away from the axis of the wire.

6. In a machine for making dental broach blanks, the combination with means for holding the wire and a cutter for operating on the wire, of means for simultaneously feeding the cutter along the wire, across the wire, and away from the axis of the wire.

7. In a machine for making dental broach blanks, a wire rest consisting of a piece provided with a hole therethrough constructed to fit the wire with a sliding and rotary fit, the said rest having one of its ends partially cut away to a depth of one-half its thickness, means for rotating the wire within the rest and a cutter arranged to operate upon the exposed portion of the wire as it lies in the rest.

8. In a machine for making dental broach blanks, a wire rest comprising a piece having a hole therethrough to receive the wire with a sliding and rotary fit, the said rest being cut away at one end to expose the wire, means for rotating the wire within the rest, a cutter arranged to operate upon the exposed portion of the wire in the rest, means for feeding the rest and cutter along the wire and means for moving the cutter away from the wire at different rates of speed.

9. In a machine for making dental broach blanks, the combination with means for holding the wire, a cutter arranged to operate on the wire, and means for feeding the cutter and wire holding means along the wire, of means for moving the cutter laterally with respect to the axis of the wire at varying degrees of speed during its movement along the wire.

10. In a machine for making dental broach blanks, the combination with a wire rest and means for holding and rotating the wire in the rest, of a cutter arranged to act upon the wire while held in the rest, means for feeding the cutter and rest along the wire and a cam provided with cam surfaces having different degrees of pitch for moving the cutter laterally with respect to the axis of the wire.

11. In a machine for making dental broach blanks, the combination with a wire rest and means for rotating the wire in the rest, of a cutter arranged to engage the wire in the rest, a cam arranged to move the cutter and rest simultaneously along the wire and a series of cams for moving the cutter laterally at different rates of speed while it is being moved along the wire.

12. In a machine for making dental broach blanks, the combination with means for holding the wire to be operated upon, of a cutter for operating on the wire, means for moving the cutter along the wire, means for moving the cutter laterally with respect to the wire as it travels along the wire, and auxiliary means for moving the cutter laterally out of engagement with the wire at the finish of its operating stroke.

13. In a machine for making dental broach blanks, the combination with means for holding the wire to be operated upon, of a cutter for operating on the wire, means for moving the cutter along the wire, means for moving the cutter laterally with respect to the wire as it travels along the wire, a spring for returning the cutter at the limit of its movement along the wire, and auxiliary means for moving the cutter laterally out of engagement with the wire before it starts on its return stroke under the influence of the spring.

In testimony, that I claim the foregoing as my invention, I have signed my name in presence of two witnesses, this 17th day of February 1910.

JAMES F. HARDY.

Witnesses:
DAVID A. McKENZIE,
EUGENE J. MASTER.

Copies of this patent may be obtained for five cents each, by addressing the "Commissioner of Patents, Washington, D. C."